(12) United States Patent
Okazawa

(10) Patent No.: US 11,099,796 B2
(45) Date of Patent: Aug. 24, 2021

(54) INFORMATION PROCESSING APPARATUS, CONTROL METHOD FOR SEARCHING PRINTING APPARATUS UNIQUELY IDENTIFYING SNMP ENGINE IDENTIFICATION OF THE PRINTING APPARATUS

(71) Applicant: CANON KABUSHIKI KAISHA, Tokyo (JP)

(72) Inventor: Takashi Okazawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/234,368

(22) Filed: Dec. 27, 2018

(65) Prior Publication Data

US 2019/0212958 A1 Jul. 11, 2019

(30) Foreign Application Priority Data

Jan. 9, 2018 (JP) .............................. JP2018-001457

(51) Int. Cl.
*G06F 3/12* (2006.01)
*H04L 12/24* (2006.01)
*H04L 12/18* (2006.01)

(52) U.S. Cl.
CPC .......... *G06F 3/1231* (2013.01); *G06F 3/1204* (2013.01); *H04L 12/185* (2013.01); *H04L 41/0213* (2013.01); *H04L 41/12* (2013.01); *H04L 41/22* (2013.01); *G06F 3/1255* (2013.01)

(58) Field of Classification Search
None
See application file for complete search history.

(56) References Cited

U.S. PATENT DOCUMENTS

| 7,779,108 | B2* | 8/2010 | Kawai | H04L 41/00 709/223 |
|---|---|---|---|---|
| 2004/0098506 | A1* | 5/2004 | Jean | H04L 61/2015 709/245 |
| 2009/0113035 | A1* | 4/2009 | Ohashi | H04L 63/20 709/223 |
| 2012/0047241 | A1* | 2/2012 | Hozumi | H04L 41/0213 709/223 |
| 2012/0069392 | A1* | 3/2012 | Kawana | H04N 1/00344 358/1.15 |

(Continued)

FOREIGN PATENT DOCUMENTS

JP 2011-13964 A 1/2011

*Primary Examiner* — Haris Sabah
(74) *Attorney, Agent, or Firm* — Canon U.S.A., Inc. IP Division

(57) ABSTRACT

An information processing apparatus communicates with a plurality of network interfaces of an external apparatus, acquires identification information for identifying the external apparatus and apparatus information about the external apparatus from the external apparatus via a network connected to the plurality of network interfaces, and stores the acquired identification information and the acquired apparatus information in association with each other. If a plurality of pieces of identification information is stored and a plurality of pieces of identical identification information is present in the pieces of identification information, only one piece of apparatus information corresponding to the identification information is displayed.

12 Claims, 11 Drawing Sheets

(56) References Cited

U.S. PATENT DOCUMENTS

| | | | |
|---|---|---|---|
| 2014/0164807 A1* | 6/2014 | Okazawa | G06F 1/3209 |
| | | | 713/323 |
| 2014/0211253 A1* | 7/2014 | Takeuchi | H04L 67/1021 |
| | | | 358/1.15 |
| 2015/0156370 A1* | 6/2015 | Ichikawa | H04N 1/00954 |
| | | | 358/1.13 |
| 2015/0261483 A1* | 9/2015 | Kato | G06F 3/1236 |
| | | | 358/1.15 |
| 2015/0350462 A1* | 12/2015 | Asai | H04N 1/00103 |
| | | | 358/1.15 |
| 2015/0378659 A1* | 12/2015 | Asai | G06F 3/1292 |
| | | | 358/1.15 |
| 2015/0382136 A1* | 12/2015 | Mihira | H04W 12/06 |
| | | | 455/41.1 |
| 2018/0329659 A1* | 11/2018 | Matsui | H04N 1/00411 |

* cited by examiner

FIG. 5

| SNMP ENGINE ID | PRODUCT NAME | MAC ADDRESS | CONNECTION STATE | IP ADDRESS |
|---|---|---|---|---|
| 123456789 | LBP-A | 00-00-5E-10-00-00-00-00 | USABLE | 192.168.0.2 |
| 123456789 | LBP-A | 00-00-5E-10-00-00-00-FF | USABLE | 192.168.1.3 |
| ... | ... | ... | ... | ... |

SETTING TOOL

| PROPERTY | DISPLAY | OPTION | HELP | UPDATE | IP SEARCH |

DEVICE LIST ~710

| PRODUCT NAME | MAC ADDRESS | STATE | IP ADDRESS |
|---|---|---|---|
| LBP123 | 000085012345 * * H5678 | USABLE | 192.168.0.2 |

~720

WIRED LAN INFORMATION
- STATE: ENABLED ~721
- IPv4 SETTING: MANUAL ~722
- IPv4: 192.168.0.2 ~723
- IPv6: TO USE ~724
- Mac: 000085012345

DETAILS SETTING ~726

~730

WIRED LAN INFORMATION
- STATE: DISABLED
- IPv4 SETTING: MANUAL
- IPv4: 192.168.3.100
- IPv6: TO USE
- Mac: 000085F00001

DETAILS SETTING ~937

| SELECT I/F | REFLECT SETTING |~751

| PRODUCT NAME | MAC ADDRESS | CONNECTION STATE |
|---|---|---|
| LBP-A | 00-00-5E-10-00-00-00-00 | USABLE |
| LBP-A | 00-00-5E-10-00-00-00-FF | USABLE |
| ... | ... | ... |

600

INFORMATION PROCESSING APPARATUS, CONTROL METHOD FOR SEARCHING PRINTING APPARATUS UNIQUELY IDENTIFYING SNMP ENGINE IDENTIFICATION OF THE PRINTING APPARATUS

BACKGROUND

Field

The present disclosure relates to an information processing apparatus, a control method for the information processing apparatus, and a program.

Description of the Related Art

An information processing apparatus such as a personal computer (PC) may be connected via a network to an external apparatus that includes a network interface connectable to the network. The information processing apparatus may search for the external apparatus connected via the network. When the information processing apparatus searches for the external apparatus, a plurality of protocols may be used with respect to one external apparatus. In such a case, a plurality of external apparatuses is displayed in a search result. There is an information processing apparatus that displays only one search result out of similar search results by using media access control (MAC) address of an image forming apparatus (see Japanese Patent Application Laid-Open No. 2011-13964).

In recent years, installation of a plurality of network interfaces in an external apparatus has become common. If an information processing apparatus searches for such an external apparatus, the external apparatus is searched via all of the networks connected to the information processing apparatus and responds to the information processing apparatus. For example, if an external apparatus includes a plurality of network interfaces, an information processing apparatus transmits a search communication packet for searching an external apparatus to each of the interfaces. The external apparatus transmits a communication packet from each of the interfaces as a response to the search communication packet. Upon receipt of the response to the search communication packet, the information processing apparatus can display external apparatus information as a search result.

However, if the external apparatus includes a plurality of network interfaces, and the information processing apparatus is connected to the external apparatus via the plurality of network interfaces, the following issue arises. When the information processing apparatus receives a plurality of responses from the same external apparatus similar to Japanese Patent Application Laid-Open No. 2011-13964, the information processing apparatus cannot determine that the responses are received from the same external apparatus by using MAC addresses because a unique MAC address is assigned to each network interface. This may mislead a user into thinking that the information processing apparatus is being connected to a plurality of external apparatuses.

SUMMARY

The present exemplary embodiment is directed to an information processing apparatus that is connected to a plurality of network interfaces of an image forming apparatus via a plurality of network interfaces of the information processing apparatus and searches for the image forming apparatus to prevent a user from being misled by a search result.

According to an aspect of the present disclosure, an information processing apparatus that communicates with a plurality of network interfaces of an external apparatus includes an acquisition unit configured to acquire identification information for identifying the external apparatus and apparatus information about the external apparatus from the external apparatus via a network connected to the plurality of network interfaces, a display unit configured to display the acquired apparatus information, and a storage unit configured to store the acquired identification information and the acquired apparatus information in association with each other, wherein, if a plurality of pieces of identification information is stored in the storage unit, and a plurality of pieces of identical identification information is present in the plurality of pieces of identification information, the display unit displays one piece of apparatus information from among of a plurality of pieces of apparatus information corresponding to the identification information.

Further features will become apparent from the following description of exemplary embodiments with reference to the attached drawings.

BRIEF DESCRIPTION OF THE DRAWINGS

FIG. 5 is a diagram illustrating one example of an apparatus information list.

FIG. 6 is a diagram illustrating one example of a main screen of application for network connection setting.

FIG. 9 is a diagram illustrating one example of an apparatus information list.

DESCRIPTION OF THE EMBODIMENTS

Exemplary embodiments are hereinafter described with reference to the drawings. The following exemplary embodiments are not intended to limit the scope of the claims of the present disclosure, and not all of the combinations of the aspects that are described in the following embodiments are necessarily required with respect to a problem to be solved by the present disclosure.

Figure 1:
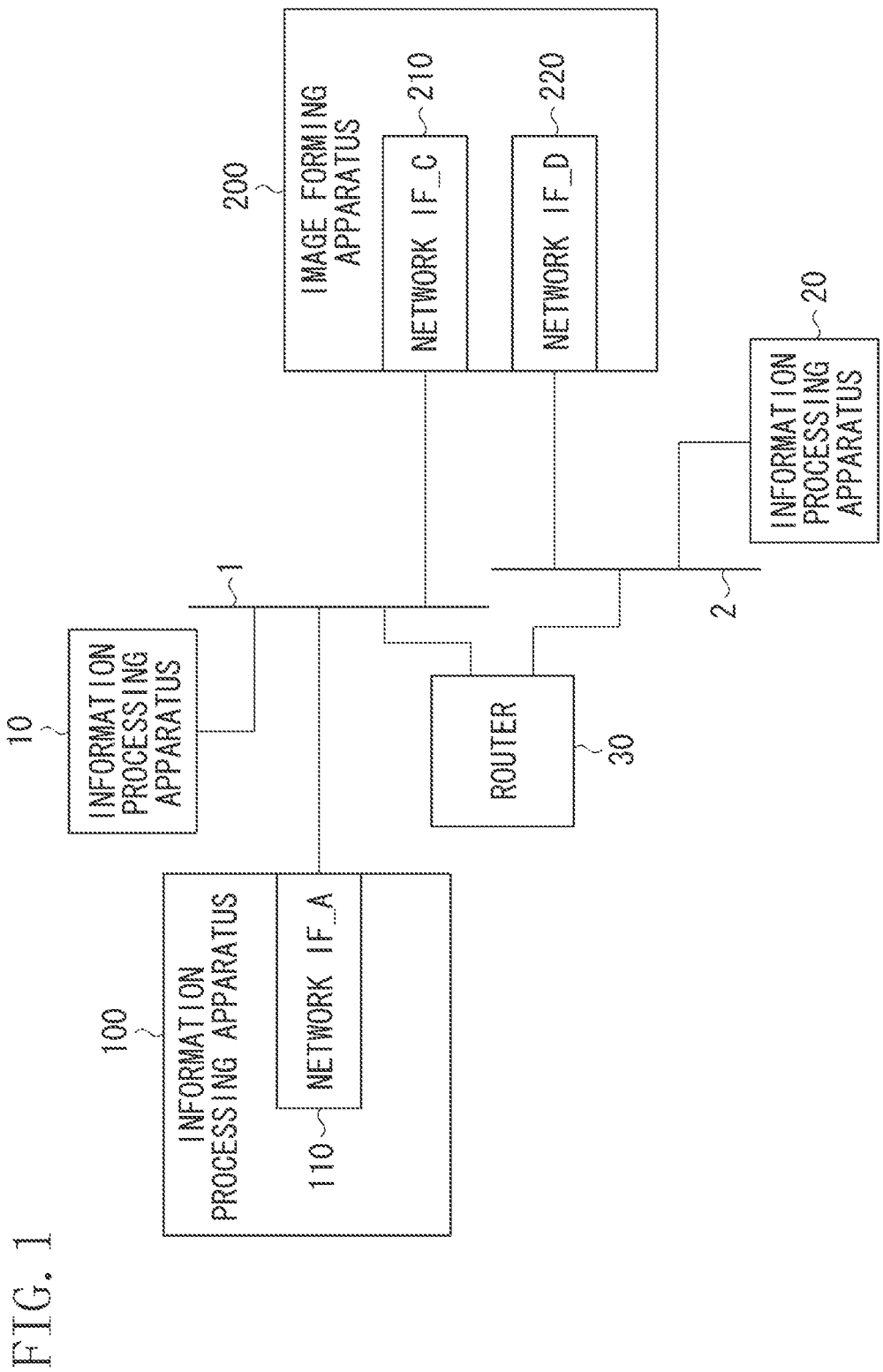
FIG. 1 is a diagram illustrating one example of a communication system according to an exemplary embodiment.

FIG. 1 is a diagram illustrating one example of a communication system according to a first exemplary embodiment.

The communication system of the present exemplary embodiment includes information processing apparatuses 100, 10, and 20 such as personal computers (PCs), a router 30, and an image forming apparatus 200 serving as an external apparatus, such as a multifunctional peripheral.

In the information processing apparatus 100 such as a PC, a network interface (IF) 110 is installed. The information processing apparatus 100 can transmit information from the network IF 110 by using broadcast communication or multicast communication. A plurality of network IFs can be installed in the information processing apparatus 100. In such a case, the information processing apparatus 100 can transmit information from the plurality of network IFs by using broadcast communication or multicast communication.

Moreover, a plurality of network IFs can also be installed in each of the information processing apparatuses 10 and 20.

In the image forming apparatus 200 such as a multifunctional peripheral serving as an external apparatus, a plurality of network IFs 210 and 220 is installed. Both the network IF 110 to be installed in the information processing apparatus 100 and the network IFs 210 and 220 to be installed in the image forming apparatus 200 is a network IF for wired local area network (LAN) communication such as Ethernet®. Such a network IF may also be connected by a universal serial bus (USB) LAN adaptor. Alternatively, an IF for wireless LAN communication may be installed, or a combination of these network IFs may be installed.

A network IF may be an IF that can perform communication conforming to a standard such as Wi-Fi® or Wi-Fi Direct® for performing wireless LAN communication.

In the present exemplary embodiment, the image forming apparatus 200 includes two network IFs. However, the present exemplary embodiment is not limited thereto. The image forming apparatus 200 can include three or more network IFs.

The present exemplary embodiment is described using an example in which each of the network IFs 210 and 220 of the image forming apparatus 200 is a wired LAN_IF.

The information processing apparatuses 100 and 10 and the image forming apparatus 200 are directly connected to a LAN 1. The information processing apparatus 20 and the image forming apparatus 200 are directly connected to a LAN 2. All of the apparatuses are communicable in both of the LANs 1 and 2 via the router 30.

A network IF_A of the information processing apparatus 100 is connected to a network IF_B and a network IF_C of the image forming apparatus 200 via the LANs 1 and 2. The information processing apparatus 100 can not only transmit data such as a print job to the image forming apparatus 200, but also make a setting of the image forming apparatus 200 via the LANs 1 and 2.

The term "print job" used herein represents data including print setting information, image data, and instruction for causing the image forming apparatus to execute print processing. The term "setting of the image forming apparatus" represents a setting of an Internet Protocol (IP) address, a network frame type of the image forming apparatus and the like. Such a setting is made so that the information processing apparatus and the image forming apparatus can communicate via a network IF.

Figure 2:
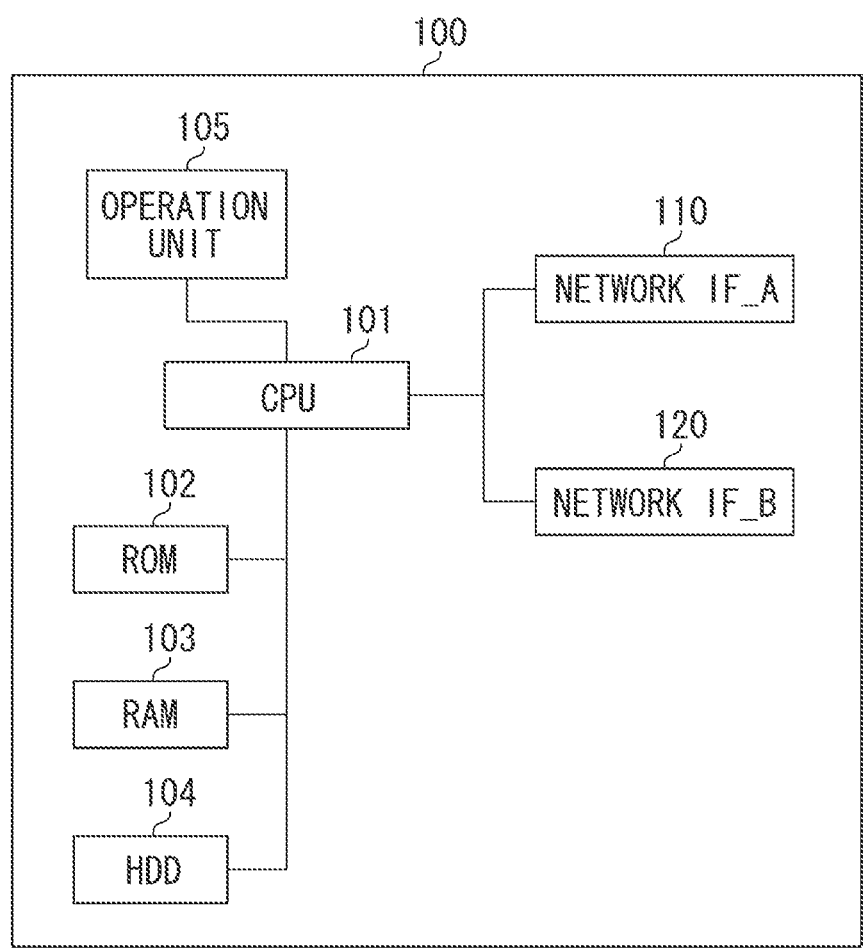
FIG. 2 is a diagram illustrating one example of a hardware configuration of an information processing apparatus.

FIG. 2 is a diagram illustrating one example of a hardware configuration of the information processing apparatus 100.

The information processing apparatus 100 includes a read only memory (ROM) 102, a random access memory (RAM) 103, a hard disk drive (HDD) 104, an operation unit 105, a display unit 106, the network IF_A 110, a network IF_B 120, and a central processing unit (CPU) 101 that controls these components.

The CPU 101 dynamically controls various hardware 102 through 106, 110, and 120 of the information processing apparatus 100, thereby providing each function of the information processing apparatus 100. The CPU 101 transmits a signal to various hardware by using a bus line, so that the CPU 101 and other hardware can mutually perform data communication.

The ROM 102 is a work memory for temporarily storing data to be used for calculation performed by the CPU 101. The RAM 103 stores a program and various data to be used by the CPU 101. The HDD 104 stores, for example, various data and various programs.

The operation unit 105 is a keyboard or a mouse for operation of the information processing apparatus 100. The operation unit 105 can be arranged in the information processing apparatus 100, or connected to the information processing apparatus 100 via a USB cable.

The display unit 106 is, for example, a display that displays information. The display unit 106 can be arranged in the information processing apparatus 100, or connected to the information processing apparatus 100 via a cable such as a high-definition multimedia interface (HDMI®) cable.

Figure 3:
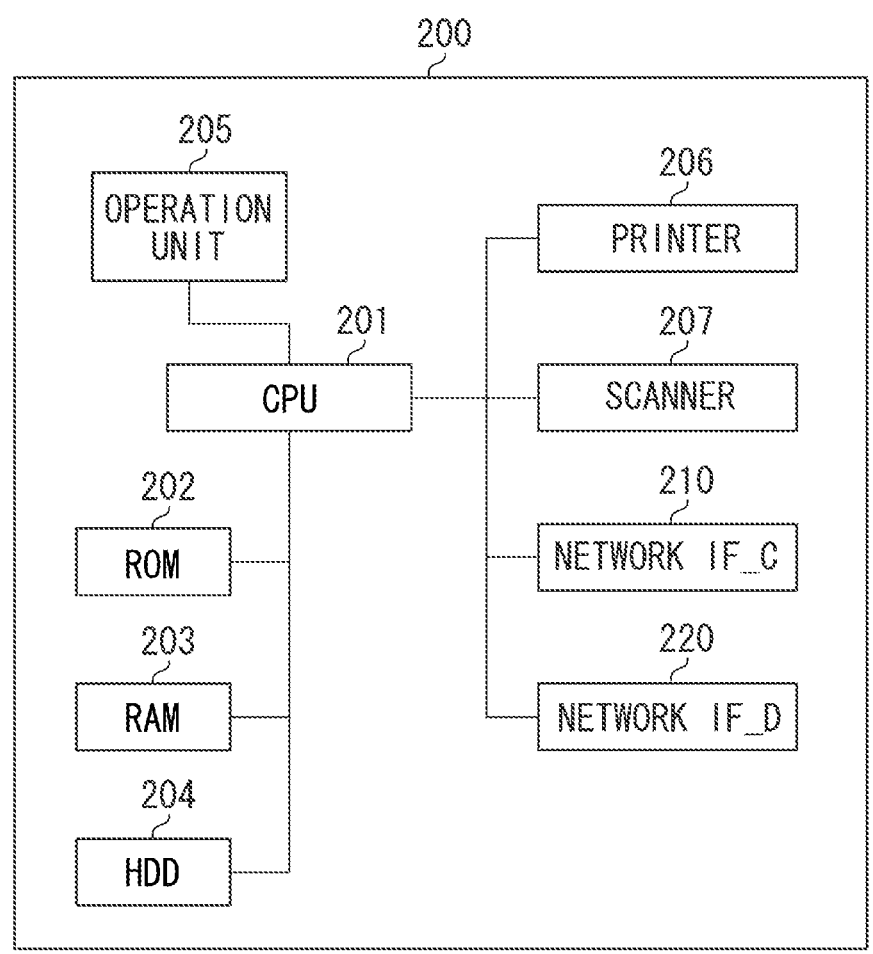
FIG. 3 is a diagram illustrating one example of a hardware configuration of an image forming apparatus.

FIG. 3 is a diagram illustrating one example of a hardware configuration of the image forming apparatus 200.

The image forming apparatus 200 includes a ROM 202, a RAM 203, an HDD 204, an operation unit 205, a printer 206, a scanner 207, a network IF_C 210, a network IF_D 220, and a CPU 201 that controls these components.

The CPU 201 dynamically controls various hardware 202 through 207, 210, and 220 of the image forming apparatus 200, thereby providing each function of the image forming apparatus 200. The CPU 201 transmits a signal to various hardware by using a bus line, so that the CPU 201 and other hardware can mutually perform data communication.

The ROM 202, the RAM 203, and the HDD 204 can work respectively similar to the ROM 102, the RAM 103, and the HDD 104 of the information processing apparatus 100.

The operation unit 205 is a user interface for the printer 206 and the scanner 207 by a user who uses the image forming apparatus 200. For example, the operation unit 205 can serve as a touch panel on which an operation or an input can be performed. The operation unit 205 can be used as a display unit that displays information about the image forming apparatus 200.

The printer 206 is a unit that provides a print function. For example, the printer 206 performs processing for outputting image data included in a print job received from an information processing apparatus connected to the same network.

The scanner 207 is a unit that provides a scan function. The scanner 207 performs processing for optically reading an original document placed on a scanner unit to convert the original document into image data.

The CPU 101 in the information processing apparatus 100 controls an operation of the information processing apparatus 100 based on a control program inside the information processing apparatus 100. In particular, the CPU 101 operates an operating system (OS) for controlling the information processing apparatus 100 and a driver program for controlling interface hardware. Then, application programs arranged on the OS mutually operate, so that control and operation of a function desired by a user are performed. The OS and the various programs are stored in the HDD 104. Such an OS and various programs are retrieved to the RAM 103 and executed.

In the present exemplary embodiment, an application program for making a setting and controlling display is operated on the information processing apparatus 100, and communicates with the image forming apparatus 200, thereby making a network connection setting (described below) of the image forming apparatus 200. The operation unit 105 and the display unit 106 receive an input from a user and display information at the time of execution of the application. An example of an input from a user includes a parameter such as an Internet Protocol (IP) address and a subnet mask for network connection.

The following operation can be performed when a mode of the information processing apparatus 100 is changed to a network setting mode by an application, and when a setting of the image forming apparatus 200 is changed to a network setting mode by a user. The changed setting is a temporary and dedicated setting that is used at the time of network connection setting.

The image forming apparatus 200 is network-connected to the information processing apparatus 100 by using a network IF, and a network connection setting of the image forming apparatus 200 is made via such a network. If a network connection setting is to be made via wired LAN communication, the image forming apparatus being connected to the information processing apparatus needs to be searched first.

Accordingly, the information processing apparatus 100 transmits a search request through multicast communication by using simple network management protocol version 3 (SNMPv3) via the network IF 110. The user makes a setting such that an IP address of the image forming apparatus 200 is acquired by Auto IP. With such a setting, the image forming apparatus 200 can receive a search request transmitted by the multicast communication. The information processing apparatus 100 performs multicast communication using a subnet mask of the IP address to be set by Auto IP.

In addition, a setting of the image forming apparatus 200 needs to be changed to a network setting mode so that an input from the information processing apparatus 100 is reflected on a network connection setting of the image forming apparatus 200 at the time of network connection setting.

Figure 4:
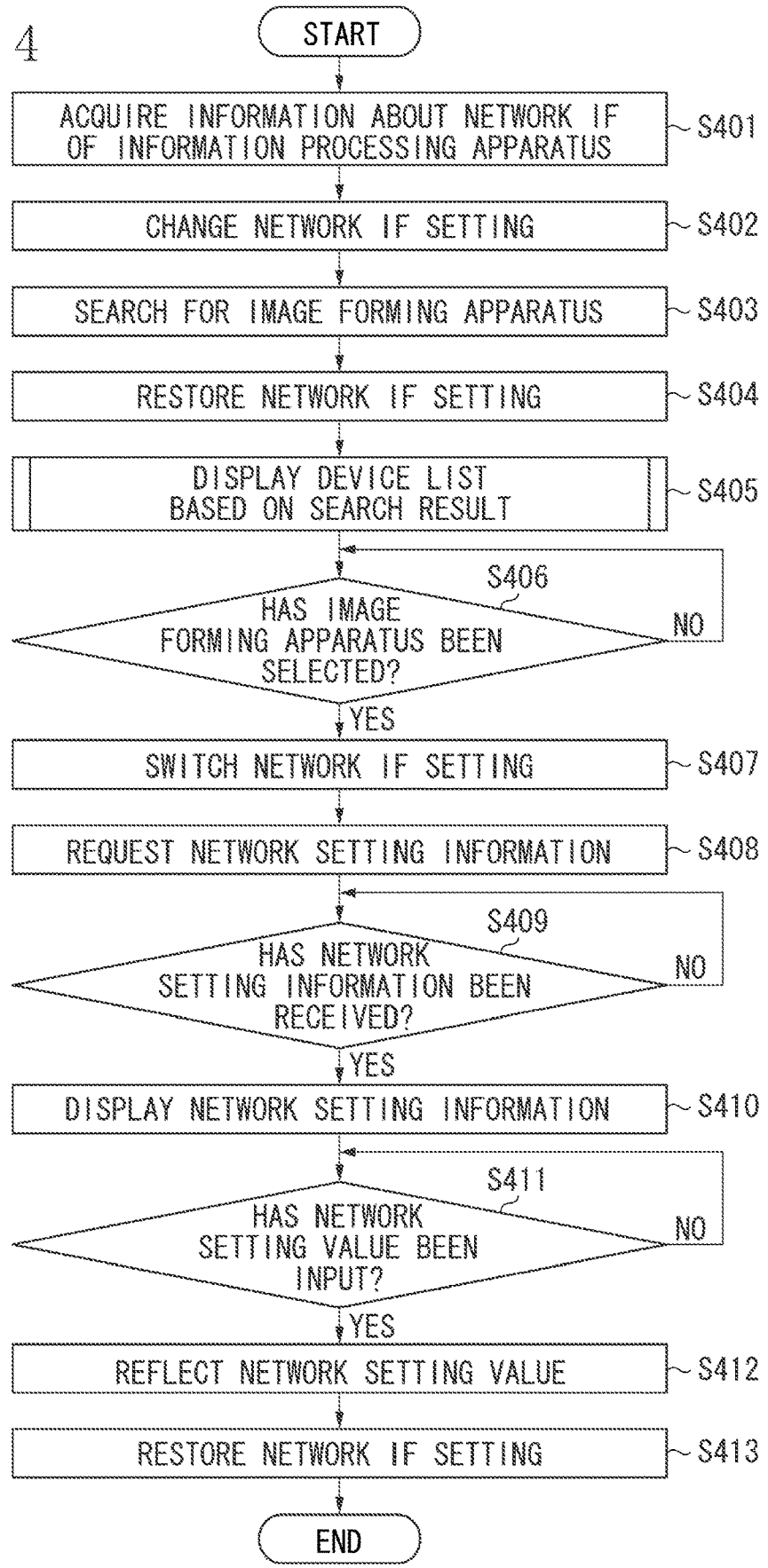
FIG. 4 is a flowchart illustrating one example of processing performed by a central processing unit (CPU) at the time of network connection setting.

FIG. 4 is a flowchart illustrating one example of processing performed by the CPU 101 at the time of network connection setting. The CPU 101 reads out a program stored in the HDD 104 to the RAM 103 and executes the program, thereby performing the processing in the flowchart illustrated in FIG. 4. The flowchart illustrated in FIG. 4 is started by execution of an application stored in the information processing apparatus 100 by a user.

In step S401, the CPU 101 checks an installation state and a setting state of a network IF on the information processing apparatus 100. In particular, the CPU 101 acquires category information about the network IF installed in the information processing apparatus 100, and determines whether the network IF is usable in an application. If the network IF is usable, the CPU 101 stores the current parameter in the RAM 103.

Subsequently, in step S402, the CPU 101 changes a setting to acquire an IP address by Auto IP so that the information processing apparatus 100 is connected to the image forming apparatus 200.

In step S403, the CPU 101 searches for an image forming apparatus via a network connected to the network IF with the setting that has been switched, and acquires apparatus information about an image forming apparatus that has responded to store such apparatus information in the RAM 103. Herein, the CPU 101 acquires simple network management protocol (SNMP) engine identification (ID) as identification information for identifying an image forming apparatus that has responded, to store the acquired SNMP engine ID in the RAM 103. The SNMP engine ID is a value unique to each apparatus. More particularly, the information processing apparatus 100 transmits a search request through multicast communication by using SNMPv3 to the connected network. The image forming apparatus 200, which has received the search request, first transmits the SNMP engine ID to a search request transmission source following a specification of the SNMPv3. Authentication is performed using the SNMP engine ID. When the authentication is completed, the image forming apparatus 200 also transmits apparatus information that is information about an apparatus designated at the time of search request. The term "apparatus information" used herein is, for example, a product name, a MAC address, a connection state, and an IP address of an image forming apparatus, but is not limited thereto.

The CPU 101 stores an apparatus information list 500 in the RAM 103. In the apparatus information list 500 as illustrated in FIG. 5, the apparatus information received by the information processing apparatus 100 is associated with the SNMP engine ID received prior to receipt of the apparatus information. Such an apparatus information list 500 is stored so that the apparatus information about the searched image forming apparatus is displayed without overlapping.

When the search of the image forming apparatus ends, the processing proceeds to step S404. In step S404, the CPU 101 refers to the setting value stored in step S401 to restore the network IF which setting is changed in step S402.

In step S405, the CPU 101 compares pieces of SNMP engine ID associated with the apparatus information in the apparatus information list 500 stored in step S403 to create a device list in which identical image forming apparatuses are not displayed in an overlapping manner, and displays the created device list on the display unit 106. The processing in step S405 will be described in detail below.

FIG. 6 is a diagram illustrating one example of a main screen of application for a network connection setting.

In a device list 710 inside a main screen 700, a product name, a serial number, an apparatus state, and an IP address of apparatus information about the searched image forming apparatus are displayed, and thus information for determining the image forming apparatus on a network is displayed.

In network information 720, network setting information such as a connection state 721 and protocol setting information 722, 723, and 724 about wired LAN communication of the image forming apparatus 200 is displayed if a device in the device list 710 is selected by a user via the operation unit 105.

In step S406, the CPU 101 receives the selection of a device (an image forming apparatus) from the device list 710, and determines whether the selection has been made by the user via the operation unit 105.

If the CPU 101 determines that the image forming apparatus has been selected (YES in step S406), the processing proceeds to step S407. In step S407, in order to input a network connection network setting of the image forming apparatus selected in step S406, the CPU 101 switches a setting of a network IF of the information processing apparatus connected with the selected image forming apparatus, to a network setting mode.

In step S408, the CPU 101 requests network setting information about the image forming apparatus from the image forming apparatus selected in step S406.

In step S409, the CPU 101 determines whether the network setting information has been received.

If the CPU 101 determines that the network setting information has been received (YES in step S409), the processing proceeds to step S410. In step S410, the CPU 101 displays the network setting information received in step S409 on the display unit 106 as the network setting information illustrated in FIG. 6.

Figure 7A:
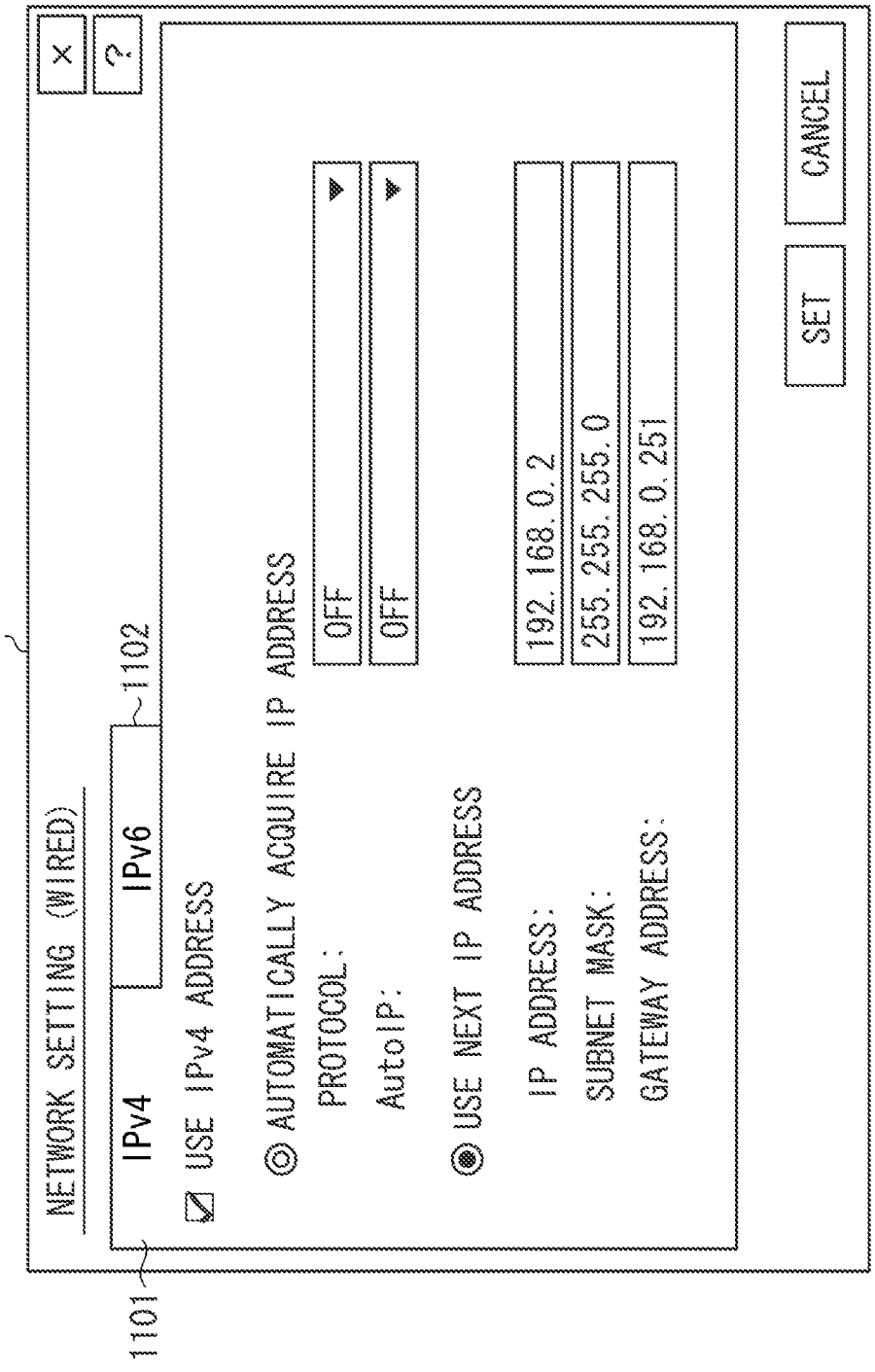
FIGS. 7A and 7B are diagrams each illustrating one example of a setting screen of application for network connection setting.
Figure 7B:
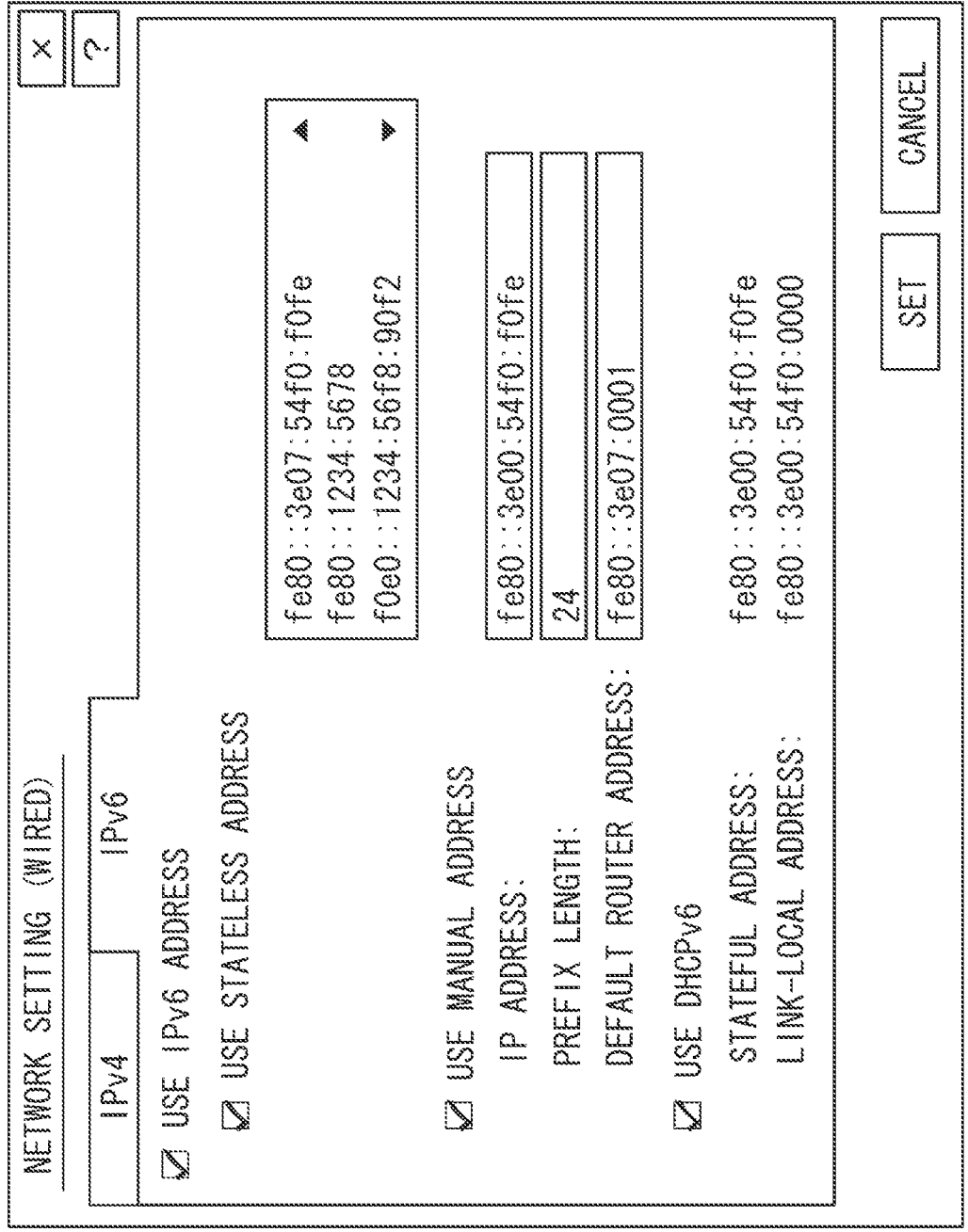

In step S411, the CPU 101 displays a network setting (wired) screen 1100 illustrated in FIG. 7A or 7B if a details setting button 726 is pressed. On the network setting (wired) screen 1100, the CPU 101 receives an input of a network setting parameter, and determines whether the network setting parameter has been input by the user via the operation unit 105.

If the CPU 101 determines that the network setting parameter has been input (YES in step S411), the processing proceeds to step S412. In step S412, the CPU 101 reflects the input network setting on the image forming apparatus if the user presses a setting reflection button 751.

In step S413, the CPU 101 refers to the setting value stored in step S401 to restore the network IF setting changed in step S402, similar to the processing in step S404. Then, the processing of the flowchart ends.

FIGS. 7A and 7B are diagrams each illustrating one example of a network setting input screen.

In FIG. 7A, an Internet protocol version 4 (IPv4) setting input screen 1101 for wired LAN communication is displayed on the network setting (wired) screen 1100.

In FIG. 7B, an IPv6 setting input screen 1102 is displayed on the network setting (wired) screen 1100.

Figure 8:
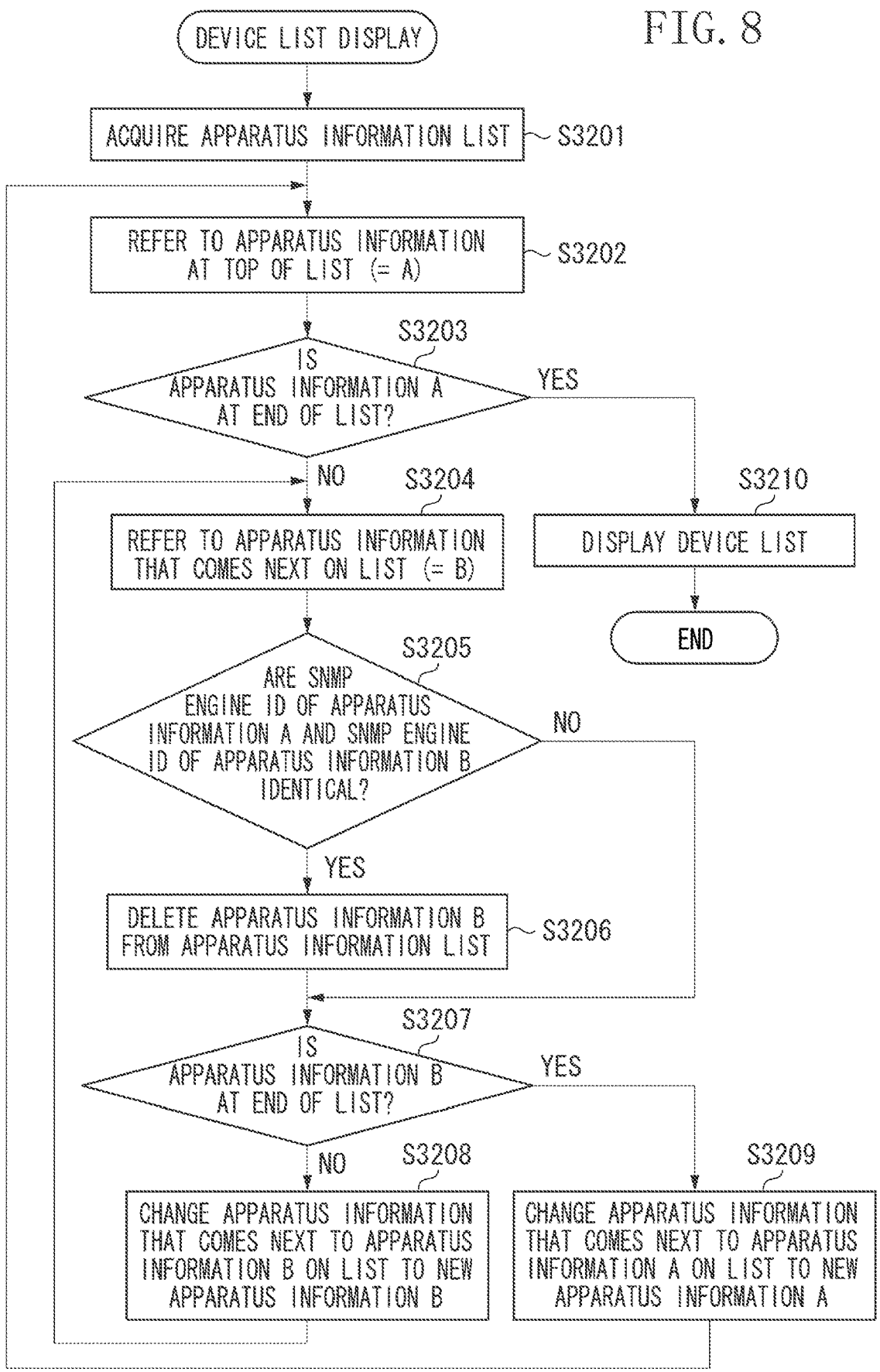
FIG. 8 is a diagram illustrating one example of processing performed by the CPU when a device list is displayed.

Next, the processing in step S405 illustrated in FIG. 4 is descried in detail with reference to FIG. 8.

FIG. 8 is a flowchart illustrating one example of a device list display method according to the present exemplary embodiment. The CPU 101 reads out a program stored in the HDD 104 and executes the program, thereby performing the processing in the flowchart illustrated in FIG. 8.

In a case where the image forming apparatus of the present exemplary embodiment includes a plurality of network interfaces, and the information processing apparatus is connected to the image forming apparatus via the plurality of network interfaces, the following issue arises. When the information processing apparatus receives a plurality of responses from the same external apparatus, the information processing apparatus cannot determine that the responses are from the same external apparatus by using MAC addresses since a unique MAC address is assigned to each network interface. This may mislead a user into thinking that the information processing apparatus is being connected to a plurality of external apparatuses.

For example, if a connection style as illustrated in FIG. 1 is used, the information processing apparatus 100 receives responses from both of the network IF_D and the network IF_C of the image forming apparatus 200. This causes two pieces of apparatus information about single image forming apparatus to be displayed.

The following processing is performed to deal with such an issue to prevent the user from being misled into thinking that an information processing apparatus is being connected to a plurality of image forming apparatuses.

In step S3201, the CPU 101 acquires the apparatus information list 500 stored in step S403. The apparatus information list 500 includes the apparatus information and the SNMP engine ID associated with the apparatus information.

In step S3202, the CPU 101 refers to apparatus information at the top of the apparatus information list 500, and sets the apparatus information as apparatus information A. The CPU 101 acquires SNMP engine ID associated with the apparatus information A.

Subsequently, in step S3203, the CPU 101 determines whether the apparatus information A is at an end of the apparatus information list 500.

If the CPU 101 determines that the apparatus information A is at the end of the apparatus information list 500 (YES in step S3203), the processing proceeds to step S3210. In step S3210, the CPU 101 displays the apparatus information in the apparatus information list 500 as a device list 710, and the processing of the flowchart illustrated in FIG. 8 ends.

If the CPU 101 determines that the apparatus information A is not at the end of the apparatus information list 500 (NO in step S3203), the processing proceeds to step S3204. In step S3204, the CPU 101 refers to apparatus information B that comes next on the apparatus information list 500, and acquires SNMP engine ID associated with the apparatus information B.

In step S3205, the CPU 101 compares the SNMP engine ID of the apparatus information A with the SNMP engine ID of the apparatus information B to determine whether the SNMP engine IDs are identical.

If the CPU 101 determines that the SNMP engine IDs are identical (YES in step S3205), the processing proceeds to step S3206. In step S3206, the CPU 101 deletes the apparatus information B from the apparatus information list 500.

If the CPU 101 determines that the SNMP engine IDs are not identical (NO in step S3205), the processing proceeds to step S3207.

In step S3207, the CPU 101 determines whether the apparatus information B is at the end of the apparatus information list 500.

If the CPU 101 determines that the apparatus information B is not at the end of the apparatus information list 500 (NO in step S3207), the processing proceeds to step S3208. In step S3208, the CPU 101 changes apparatus information that comes next to the apparatus information B on the apparatus information list 500 to new apparatus information B. Then, the processing returns to step S3204.

If the CPU 101 determines that the apparatus information B is at the end of the apparatus information list 500 (YES in step S3207), the processing proceeds to step S3209. In step S3209, the CPU 101 changes apparatus information that comes next to the apparatus information A to new apparatus information A. Then, the processing returns to step S3202.

Accordingly, the information processing apparatus of the present exemplary embodiment associates the SNMP engine ID acquired by SNMP communication with apparatus information, stores the SNMP engine ID associated with the apparatus information, compares such SNMP engine IDs, and makes a deletion such that a plurality of pieces of apparatus information associated with identical SNMP engine ID is reduced to one. Accordingly, the apparatus information about identical image forming apparatuses is displayed on the device list 710 without overlapping.

According to the present exemplary embodiment, an information processing apparatus can be connected to a plurality of network interfaces of an image forming apparatus via a plurality of network interfaces of the information processing apparatus, and search for the image forming apparatus, and prevent a user from being misled based on a search result.

The first exemplary embodiment has been described using an example in which a network IF of the image forming apparatus 200 is a wired LAN_IF. The second exemplary embodiment is described with respect to the difference from the first exemplary embodiment. In the present exemplary embodiment, at least one of network IFs of an image forming apparatus 200 is a wireless LAN_IF, and an information processing apparatus 100 includes at least a wireless LAN_IF.

In the first exemplary embodiment, a search packet is transmitted by SNMP communication based on any network IF of the information processing apparatus 100 to acquire SNMP engine ID and apparatus information in the processing for searching for the image forming apparatus as described in step S403. In the present exemplary embodiment, on the other hand, the following search processing is performed instead of the search processing in step S403.

When an information processing apparatus 100 and an image forming apparatus 200 perform search processing by wireless LAN communication, the information processing apparatus 100 first searches for an access point in the vicinity using a wireless LAN_IF. The information processing apparatus 100 acquires service set identifier (SSID) of the access point as a result of the search processing.

In SSID of a wireless LAN_IF of the image forming apparatus 200, a character string indicating, for example, a product name and a MAC address of the image forming apparatus 200 is set. For example, if an image forming apparatus has a product name of LBP-A and a MAC address of 00005E1000000000, a character string such as "LBP-A_0005E1000000000" is set in SSID of a wireless LAN_IF of the image forming apparatus.

A MAC address to be indicated in SSID is a MAC address of a wired LAN_IF, not a MAC address of a wireless LAN_IF. If the image forming apparatus 200 includes two wireless LAN_IFs, one of MAC addresses can be indicated in SSID of the two wireless LAN_IFs.

The information processing apparatus 100 determines whether there is a product name of the image forming apparatus in a character string of the acquired SSID. Accordingly, the information processing apparatus 100 can determine that such SSID belongs to the image forming apparatus 200.

For transmission of such special SSID, the image forming apparatus 200 needs to be temporarily changed to a network setting mode. In addition to such a change to the network setting mode, the wireless LAN_IF of the image forming apparatus 200 needs to be in an access point (AP) mode.

In a wired LAN_IF of the image forming apparatus 200 which has been changed to the network setting mode, an IP address is acquired by Auto IP similar to the first exemplary embodiment, and information such as a MAC address and a product name is acquired by communication with the information processing apparatus 100.

In the first exemplary embodiment, the information processing apparatus 100 creates the apparatus information list 500 in which received apparatus information is associated with SNMP engine ID received prior to receipt of the apparatus information, and stores the apparatus information list 500 in the RAM 103. In the present exemplary embodiment, the information processing apparatus 100 creates an apparatus information list by the following method, and stores the created apparatus information list in a RAM 103.

FIG. 9 is a diagram illustrating one example of an apparatus information list.

If searched SSID includes SSID of the image forming apparatus 200 which operates in an AP mode, the information processing apparatus 100 performs the following processing. The information processing apparatus 100 distinguishes, for example, a product name and a MAC address included in the acquired SSID of the image forming apparatus for each information, and creates an apparatus information list in which a MAC address and apparatus information are associated with each other as an apparatus information list 600 illustrated in FIG. 9. Then, the information processing apparatus 100 stores the created apparatus information list in the RAM 103.

The information processing apparatus 100 and the image forming apparatus 200 may make a network setting via wireless LAN communication. In such a case, the information processing apparatus 100 serves as a dynamic host configuration protocol (DHCP) client to acquire an IP address from the image forming apparatus 200 that serves as a DHCP server, and performs communication.

Figure 10:
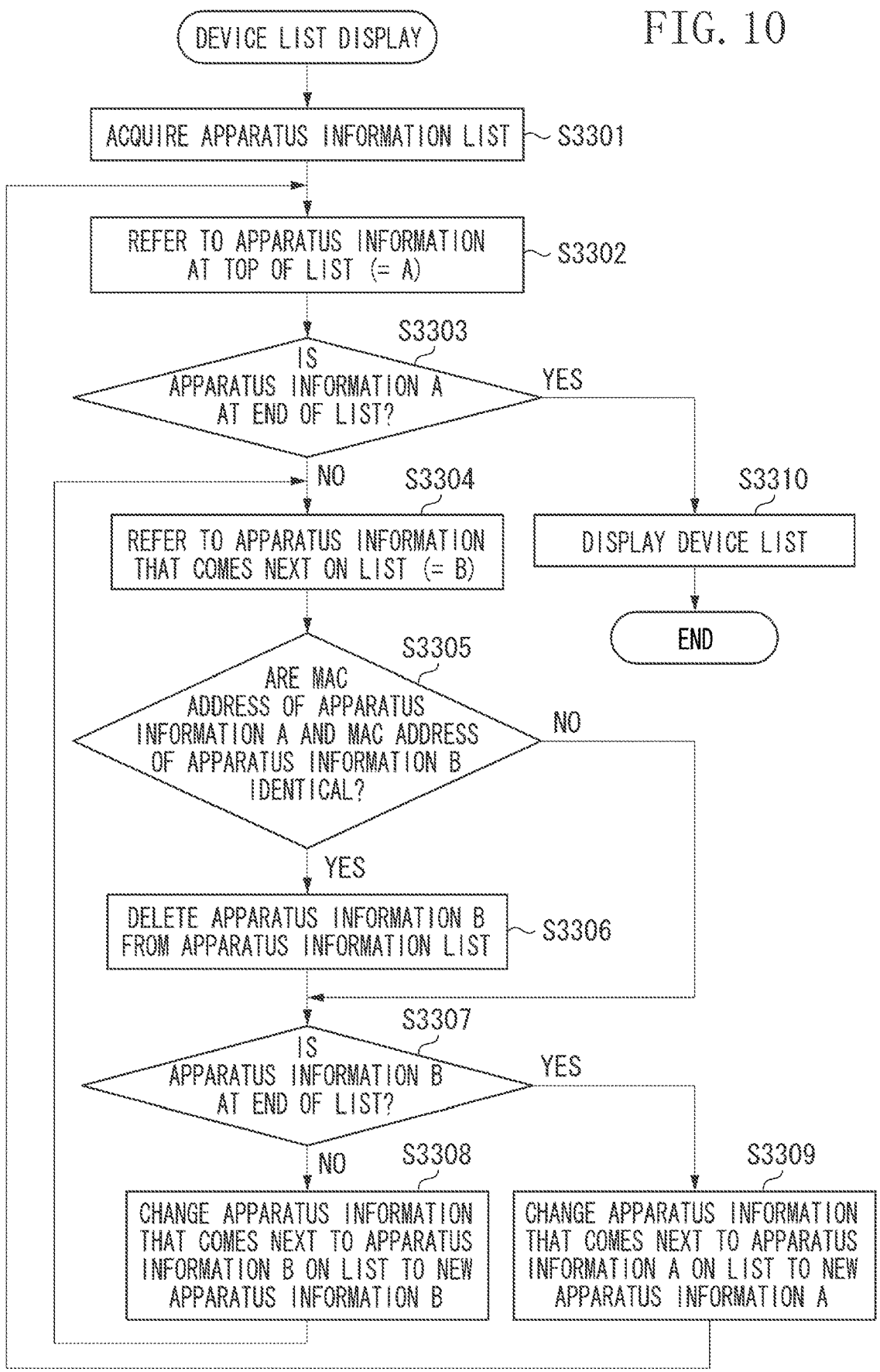
FIG. 10 is a diagram illustrating one example of processing performed by the CPU when a device list is displayed.

FIG. 10 is a flowchart illustrating one example of a device list display method according to the present exemplary embodiment.

In step S3301, a CPU 101 acquires apparatus information such as a product name and a MAC address indicated in SSID, creates an apparatus information list 600 on a device basis, and stores the apparatus information list 600 in the RAM 103 so that apparatus information about a searched image forming apparatus is displayed without overlaps.

In step S3302, the CPU 101 refers to apparatus information at the top of the apparatus information list 600, and sets the apparatus information as apparatus information A. The CPU 101 acquires a MAC address included in the apparatus information A.

Subsequently, in step S3303, the CPU 101 determines whether the apparatus information A is at the end of the apparatus information list 600.

If the CPU 101 determines that the apparatus information A is not at the end of the apparatus information list 600 (NO in step S3303), the processing proceeds to step S3304. In step S3304, the CPU 101 refers to apparatus information B that comes next on the apparatus information list 600, and acquires a MAC address included in the apparatus information B.

If the CPU 101 determines that the apparatus information A is at the end of the apparatus information list 600 (YES in step S3303), the processing proceeds to step S3310. In step S3310, the CPU 101 displays the apparatus information in the apparatus information list 600 as a device list 710, and the processing of the flowchart ends.

In step S3305, the CPU 101 compares the MAC address of the apparatus information A with the MAC address of the apparatus information B to determine whether the MAC addresses are identical.

If the CPU 101 determines that the MAC addresses are identical (YES in step S3305), the processing proceeds to step S3306. In step S3306, the CPU 101 deletes the apparatus information B from the apparatus information list 600.

If the CPU 101 determines that the MAC addresses are not identical (NO in step S3305), the processing proceeds to step S3307.

In step S3307, the CPU 101 determines whether the apparatus information B is at the end of the apparatus information list 600.

If the CPU 101 determines that the apparatus information B is not at the end of the apparatus information list 600 (NO in step S3307), the processing proceeds to step S3308. In step S3308, the CPU 101 changes apparatus information that comes next to the apparatus information B on the apparatus information list 600 to new apparatus information B, and the processing returns to step S3304.

If the CPU 101 determines that the apparatus information B is at the end of the apparatus information list 600 (YES in step S3307), the processing proceeds to step S3309. In step S3309, the CPU 101 changes apparatus information that comes next to the apparatus information A to new apparatus information A, and the processing returns to step S3302.

As mentioned above, in the loop processing, the MAC addresses indicated in the SSID are compared and a deletion is made to prevent the apparatus information about identical image forming apparatuses from being displayed in an overlapping manner in the device list 710.

According the present exemplary embodiment, when an information processing apparatus is connected to a plurality of network interfaces including at least a wireless LAN_IF of an image forming apparatus and searches for the image forming apparatus, a user can be prevented from being misled based on a result of the search.

Other Exemplary Embodiment

The purpose of the present exemplary embodiment is achieved by executing the following processing. That is, a storage medium in which a program code for providing a function of each of the above-described exemplary embodiments is recorded is supplied to a system or an apparatus, and a computer (or a processing unit such as a CPU or a micro processing unit (MPU)) of the system or the apparatus reads out the program code stored in the storage medium. In such processing, the program code per se read from the storage medium provides the function of the exemplary embodiment, and such a program code is included in the present disclosure.

The present disclosure includes a case in which a function of each of the above-described exemplary embodiments is provided by execution of the program code read out by the computer. In addition, the present disclosure includes a case in which, for example, an OS running on the computer partially or entirely performs the actual processing based on an instruction from the program code, and a function of each of the above-described exemplary embodiments is provided by such processing.

According to each of the exemplary embodiments, an information processing apparatus is connected to a plurality of network interfaces of an image forming apparatus via a plurality of network interfaces of the information processing apparatus, and searches for the image forming apparatus, thereby preventing a user from being misled based on a search result.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-001457, filed Jan. 9, 2018, which is hereby incorporated by reference herein in its entirety.

What is claimed is:

1. An information processing apparatus that communicates with a printing apparatus having a plurality of network interfaces, the information processing apparatus comprising:
   at least one memory that stores instructions; and
   at least one processor that executes the stored instructions to:
   perform search processing to search for an external network device, wherein a type of a device to be found as a result of the search processing is the printing apparatus;
   acquiring a simple network management protocol (SNMP) engine identification (ID) for uniquely identifying SNMP Agent of the printing apparatus and apparatus information about the printing apparatus as a result of the search processing; and
   display a printing apparatus list showing printing apparatuses based on the acquired apparatus information which is acquired as the result of the search processing,
   wherein, in a case where two or more printing apparatuses are found as the result of the search processing, the printing apparatus list is automatically displayed after the search processing is completed, and
   wherein, in a case where two or more printing apparatuses that have the same SWAP engine ID have been found as the result of the search processing, the found two or more printing apparatuses that have the same SNMP engine ID are displayed as a single display item corresponding to the found two or more printing apparatuses that have the same SNMP engine ID, and each found printing apparatus that does not have the same SNMP engine ID is displayed as a different display item, on the printing apparatus list to be automatically displayed after the search processing is completed.

2. The information processing apparatus according to claim 1, wherein in the search processing, a discovery request is transmitted via a network connected to the plurality of network interfaces.

3. The information processing apparatus according to claim 1, wherein the same SNMP engine ID and the apparatus information are acquired SNMP communication with the printing apparatus connected via a network connected to the plurality of network interfaces.

4. The information processing apparatus according to claim 1, wherein the acquired apparatus information includes at least one of a product name, a media access control (MAC) address, and an Internet protocol (IP) address of the printing apparatus.

5. The information processing apparatus according to claim 1, wherein the plurality of the network interfaces of the external network device includes a wired network interface and a wireless network interface.

6. The information processing apparatus according to claim 1, wherein the at least one processor further executes the stored instructions to:
receive a user operation for designating printing apparatus for which network setting is to be changed among those in the displayed printing apparatus list;
display a setting change screen based on network setting information acquired from the designated printing apparatus; and
transmit network setting information changed via the setting change screen to the designated printing apparatus.

7. The information processing apparatus according to claim 6,
wherein, in a case where the designated printing apparatus is the printing apparatus having the plurality of network interfaces, the setting change screen is configured to be able to receive at least an operation for changing setting of a first network interface and setting of a second network interface of the designated printing apparatus.

8. A control method for an information processing apparatus that communicates with a printing apparatus having a plurality of network interfaces, the control method comprising:
performing search processing to search for an external network device, wherein a type of a device to be found as a result of the search processing is the printing apparatus;
acquiring a simple network management protocol (SNMP) engine identification (ID) for uniquely identifying SNMP Agent of the printing apparatus and apparatus information about the printing apparatus as a result of the search processing; and
displaying a printing apparatus list showing printing apparatuses based on the acquired apparatus information which is acquired as the result of the search processing,
wherein, in a case where two or more printing apparatuses are found as the result of the search processing, the printing apparatus list is automatically displayed after the search processing is completed, and
wherein, in a case where two or more printing apparatuses that have the same SNMP engine ID have been found as the result of the search processing, the found two or more printing apparatuses that have the same SNMP engine ID are displayed as a single display item corresponding to the found two or more printing processing apparatuses that have the same SNMP engine ID, and each found printing apparatus that does not have the same SNMP engine ID is displayed as a different display item, on the printing apparatus list to be automatically displayed after the search processing is completed.

9. The control method according to claim 8, wherein in the search processing a request is transmitted via a network connected to the plurality of network interfaces.

10. The control method according to claim 8, further comprising acquiring the SNMP engine ID and the apparatus information by SNMP communication with the printing apparatus connected via a network connected to the plurality of network interfaces.

11. A non-transitory computer-readable storage medium storing a program for causing a computer to execute a control method for an information processing apparatus that communicates an printing apparatus having a plurality of network interfaces, the control method comprising:
performing search processing to search for an external network device, wherein a type of a device to be found as a result of the search processing is the printing apparatus;
acquiring a simple network management protocol (SNMP) engine identification (ID) for uniquely identifying SNMP Agent of the printing apparatus and apparatus information about the printing apparatus as a result of the search processing; and
displaying a printing apparatus list showing printing apparatuses based on the acquired apparatus information which is acquired as the result of the search processing,
wherein, in a case where two or more printing apparatuses are found as the result of the search processing, the printing apparatus list is automatically displayed after the search processing is completed, and
wherein, in a case where two or more printing apparatuses that have the same SNMP engine ID have been found as the result of the search processing, the found two or more printing apparatuses that have the same SNMP engine ID are displayed as a single display item corresponding to the found two or more printing apparatuses that have the same SNMP engine ID, and each found printing apparatus that does not have the same SNMP engine ID is displayed as a different display item, on the printing apparatus list to be automatically displayed after the search processing is completed.

12. The non-transitory computer-readable storage medium according to claim 11, wherein the acquired apparatus information includes at least one of a product name, a MAC address, and an IP address of the printing apparatus.

* * * * *